(12) United States Patent
Baldwin et al.

(10) Patent No.: US 9,317,846 B2
(45) Date of Patent: *Apr. 19, 2016

(54) POINT OF SALE FOR MOBILE TRANSACTIONS

(71) Applicant: AT&T Intellectual Property I, L.P., Atlanta, GA (US)

(72) Inventors: Christopher F. Baldwin, Algonquin, IL (US); Bruce Barnes, Pingree Grove, IL (US); Wayne Heinmiller, Elgin, IL (US); Patrick Kenny, Barrington, IL (US); Shadi I. Khoshaba, Skokie, IL (US); Dolores J. Mallian, St. Charles, IL (US); Nikhil S. Marathe, Roselle, IL (US); Charles M. Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,770

(22) Filed: Sep. 4, 2015

(65) Prior Publication Data

US 2015/0379498 A1 Dec. 31, 2015

Related U.S. Application Data

(63) Continuation of application No. 13/309,057, filed on Dec. 1, 2011, now Pat. No. 9,129,273.

(51) Int. Cl.
  *G06Q 20/00* (2012.01)
  *G06Q 30/00* (2012.01)
  (Continued)

(52) U.S. Cl.
  CPC .......... *G06Q 20/204* (2013.01); *G06Q 20/3274* (2013.01); *G06Q 20/00* (2013.01); *G06Q 30/00* (2013.01); *G06Q 30/06* (2013.01)

(58) Field of Classification Search
  CPC ....... G06Q 20/00; G06Q 20/20; G06Q 20/40; G06Q 40/00; G06Q 50/00; G06Q 30/00; G06Q 30/06
  USPC .................... 705/14.23, 16–18, 21, 24, 30, 40
  See application file for complete search history.

(56) References Cited

U.S. PATENT DOCUMENTS

| 7,213,766 B2 | 5/2007 | Ryan | |
| 7,493,130 B2 * | 2/2009 | Loveland | ............ H04L 67/1095 370/350 |

(Continued)

OTHER PUBLICATIONS mobile88.com, "Nokia 6216 Classic Preview", http://www.mobile88.com/cellphone/Nokia/Nokia-6216-Classic/ preview.asp.

(Continued)

*Primary Examiner* — Olusegun Goyea
(74) *Attorney, Agent, or Firm* — Hartman & Citrin LLC

(57) ABSTRACT

Devices, systems, and methods are disclosed which relate to using a remote scanner for mobile transactions. A point of sale (POS) terminal communicates with a remote scanner that is removably coupled to the POS terminal. Logic on the POS terminal generates a request for a transaction information and transmits the request along with a restriction to the remote scanner. Logic on the remote scanner receives the request and the restriction, transmits the request to a mobile device, receives the transaction information while monitoring the restriction, and transmits the transaction information to the POS terminal for processing. The transaction information may be provided subject to the restriction.

20 Claims, 10 Drawing Sheets

(51) Int. Cl.
*G06G 1/12* (2006.01)
*G07B 17/00* (2006.01)
*G07F 19/00* (2006.01)
*G06Q 20/20* (2012.01)
*G06Q 20/32* (2012.01)
*G06Q 30/06* (2012.01)

(56) References Cited

U.S. PATENT DOCUMENTS

| | | | |
|---|---|---|---|
| 7,873,540 B2 | 1/2011 | Arumugam | |
| 7,942,337 B2 | 5/2011 | Jain | |
| 7,961,101 B2 | 6/2011 | Narendra | |
| 8,306,861 B2 * | 11/2012 | Dunsmore | G06Q 20/102 705/15 |
| 8,498,900 B1 * | 7/2013 | Spirin | G06Q 50/00 340/286.09 |
| 8,696,765 B2 * | 4/2014 | Mendez | G06F 21/62 455/419 |
| 2002/0095380 A1 * | 7/2002 | Singhal | G06Q 20/02 705/40 |
| 2002/0133418 A1 * | 9/2002 | Hammond | G06Q 30/06 705/26.8 |
| 2003/0055792 A1 * | 3/2003 | Kinoshita | G06Q 20/04 705/67 |
| 2005/0043996 A1 * | 2/2005 | Silver | G06Q 10/02 705/15 |
| 2005/0108116 A1 * | 5/2005 | Dobson | G06Q 40/12 705/30 |
| 2006/0235898 A1 * | 10/2006 | Loveland | H04L 67/1095 |
| 2006/0283935 A1 * | 12/2006 | Henry | G06Q 20/20 235/380 |
| 2007/0123305 A1 | 5/2007 | Chen | |
| 2007/0145152 A1 | 6/2007 | Jogand-Coulomb | |
| 2008/0071625 A1 * | 3/2008 | Arumugam | G06Q 20/20 705/17 |
| 2008/0245851 A1 | 10/2008 | Kowalski | |
| 2009/0026277 A1 | 1/2009 | Phillips | |
| 2009/0037286 A1 * | 2/2009 | Foster | G06Q 20/20 705/21 |
| 2009/0055276 A1 * | 2/2009 | Dunsmore | G06Q 20/102 705/15 |
| 2009/0055280 A1 * | 2/2009 | Dunsmore | G06Q 20/102 705/17 |
| 2009/0143104 A1 | 6/2009 | Loh | |
| 2009/0241186 A1 | 9/2009 | Naniyat | |
| 2010/0009627 A1 | 1/2010 | Huomo | |
| 2010/0181377 A1 | 7/2010 | Chen | |
| 2010/0320266 A1 * | 12/2010 | White | G06Q 20/20 235/375 |
| 2011/0004941 A1 * | 1/2011 | Mendez | G06F 21/62 726/26 |
| 2011/0125566 A1 * | 5/2011 | McLaughlin | G06Q 20/20 705/14.23 |
| 2011/0178883 A1 * | 7/2011 | Granbery | G06Q 20/10 705/16 |
| 2011/0231272 A1 * | 9/2011 | Englund | G06Q 20/20 705/21 |
| 2011/0238514 A1 * | 9/2011 | Ramalingam | G06Q 20/10 705/21 |
| 2011/0313867 A9 * | 12/2011 | Silver | G06Q 10/02 705/15 |
| 2011/0320294 A1 * | 12/2011 | Votaw | G06Q 20/10 705/17 |
| 2012/0011007 A1 * | 1/2012 | Blewett | G06Q 20/20 705/16 |
| 2012/0022957 A1 * | 1/2012 | Sun | G06Q 20/085 705/16 |
| 2012/0054046 A1 * | 3/2012 | Albisu | G06Q 20/20 705/16 |
| 2012/0143707 A1 * | 6/2012 | Jain | G06Q 20/20 705/18 |
| 2012/0240195 A1 * | 9/2012 | Weiss | H04L 63/0846 726/4 |
| 2012/0259715 A1 * | 10/2012 | Robson | G06Q 30/06 705/16 |
| 2012/0290472 A1 * | 11/2012 | Mullen | G06Q 10/00 705/39 |
| 2012/0296679 A1 * | 11/2012 | Im | G06Q 10/02 705/5 |

OTHER PUBLICATIONS

S. Manimaraa, "Nokia 6216 classic: First Replacement for Credit Card: NFC Device", Pspezone.com, Apr. 25, 2009, http://www.pspezone.com/uncategorized/nokia-6216-classic-first-replacement-for-credit-card-nfc-device/.
Claire Swedberg, "MicroSD Card Brings NFC to Phones for Credit Card Companies, Banks", RFID Journal, Nov. 25, 2009, http://wwwwiseupjournal.com/?p=1272.
Oberthur Technologies, "Providing an innovative, customizable and convenient means of payment to meet the growing demand of consumers in the U.S. and abroad", Aug. 3, 2010, http://www.oberthurcs.com/press_page.aspx?Id=238.
Vivo Tech, "ViVOtag Sticker Technology Increases Customer Loyalty, Usage and Redemption of Promotions and Wallet Share of Payment Cards", http://www.vivotech.com/products/vivo_card/vivo_tag.asp.
U.S. Office Action dated Oct. 6, 2014 in U.S. Appl. No. 13/309,057.
U.S. Office Action dated Feb. 4, 2015 in U.S. Appl. No. 13/309,057.
U.S. Notice of Allowance dated Apr. 16, 2015 in U.S. Appl. No. 13/309,057.

* cited by examiner

POINT OF SALE FOR MOBILE TRANSACTIONS

CROSS-REFERENCE TO RELATED APPLICATION

This application is a continuation of and claims priority to U.S. patent application Ser. No. 13/309,057, filed Dec. 1, 2011, now U.S. Pat. No. 9,129,273, the content of which is herein incorporated by reference in its entirety.

BACKGROUND OF THE SUBJECT DISCLOSURE

1. Field of the Subject Disclosure

The subject disclosure relates to mobile transactions. More specifically, the subject disclosure relates to a point-of-sale (POS) for mobile transactions.

2. Background of the Subject Disclosure

Some mobile devices may be used to perform transactions. Such mobile devices may transmit payment and authentication information to a POS terminal. However, this process has its inconveniences for a user. For instance, at many businesses the POS terminal may be located in an area inaccessible by the user, such as in a restaurant where a customer may hand his mobile device or other transaction instrument to a waiter. Not all users prefer to relinquish their mobile device to a waiter or valet, especially when the mobile device may be a smart phone that contains sensitive information, such as personal information and financial data. Further, relinquishing a mobile device to a stranger renders a user unable to communicate with friends, family, and emergency service providers.

SUMMARY OF THE SUBJECT DISCLOSURE

The subject disclosure presents devices, systems, and methods for using a remote scanner for mobile transactions. In one example embodiment, the subject disclosure may be a system for mobile transactions. The system may include a remote scanner removably coupled to a POS terminal, logic on the POS terminal for generating a request for a transaction information and transmitting the request along with a restriction to the remote scanner, and logic on the remote scanner for receiving the request and the restriction, transmitting the request to a mobile device, receiving the transaction information from the mobile device, monitoring the restriction, and transmitting the transaction information to the POS terminal for processing.

In another example embodiment, the subject disclosure may be a point-of-sale (POS) terminal for mobile transactions, the POS terminal may include a processor, a memory in communication with the processor, a transceiver in communication with the processor, and logic on the memory for generating a request for a transaction information and transmitting the request along with a restriction to a remote scanner via an interface. The remote scanner may include logic for receiving the request and the restriction, transmitting the request to a mobile device, receiving the transaction information from the mobile device, monitoring the restriction, and transmitting the transaction information to the POS terminal via the interface.

In yet another example embodiment, the subject disclosure may be a computer-executable program stored on a computer-readable medium that, when executed by a processor, performs a mobile transaction. The program may include instructions for generating a request for transaction information, transmitting the request along with a restriction to a remote scanner via an interface, and receiving the transaction information from the remote scanner via the interface, the transaction information being provided to the remote scanner from a mobile device. The transaction information may be provided subject to the restriction.

DETAILED DESCRIPTION OF THE SUBJECT DISCLOSURE

Figure 1:
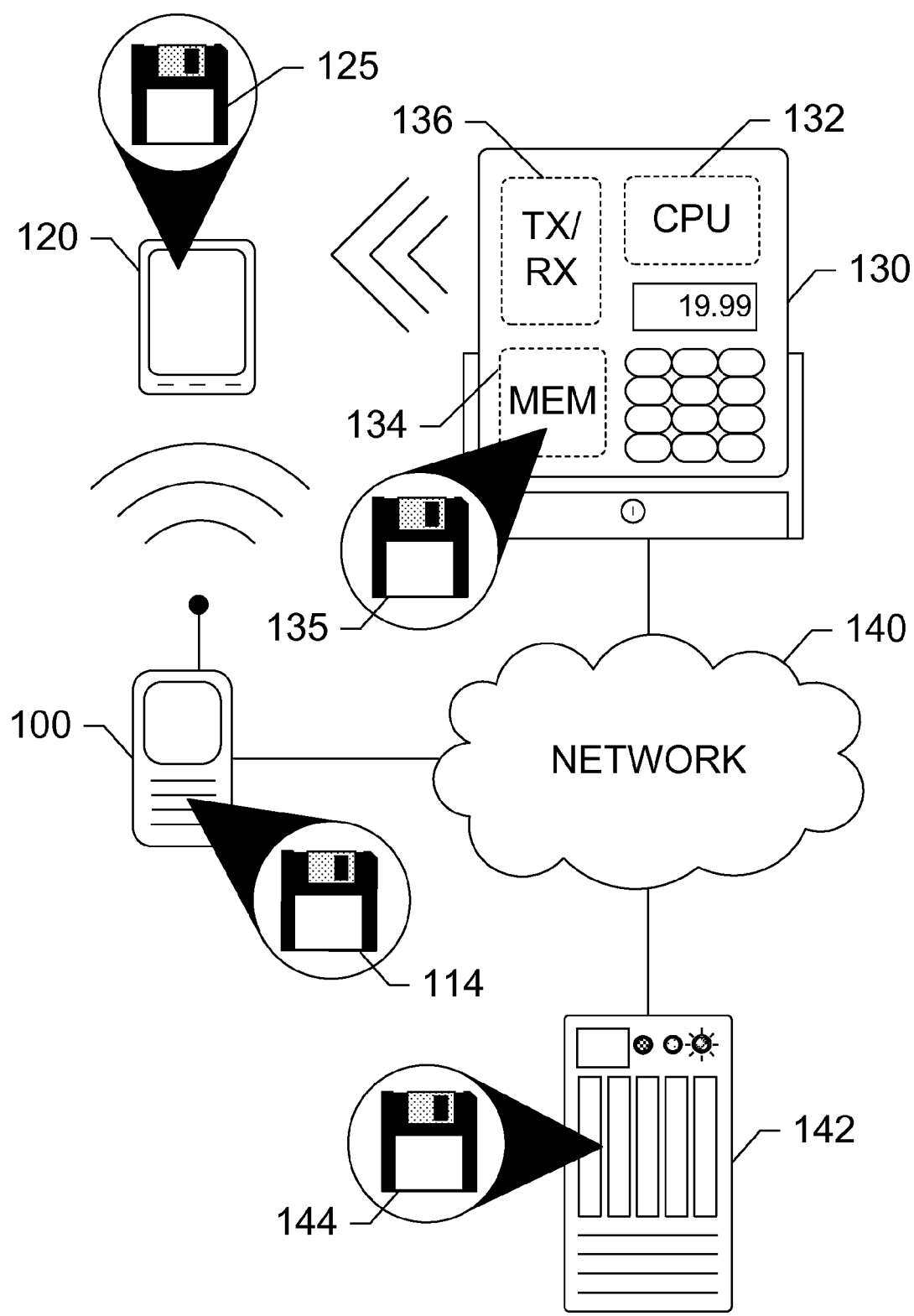
FIG. 1 shows a system for mobile transactions, according to an example embodiment of the subject disclosure.

The subject disclosure presents devices, systems, and methods for mobile transactions using a remote scanner. In example embodiments, the remote scanner may communicate with the POS terminal via an interface that may be wired or wireless, and may be removably coupled to the POS terminal. The POS terminal may program the remote scanner with a request for transaction information from a customer or other entity to be authenticated. The request for transaction information may include a bill of sale for goods or services purchased by the customer. The remote scanner may be transported to within close proximity of a mobile device owned by the customer, or placed at a location convenient to the customer or a user of the mobile device. The mobile device may contain or have access to transaction information associated with the user. The transaction information may include identification information of the mobile device, identification information of the user, payment information, medical records, preferences, etc.

The mobile device may communicate the transaction information to the remote scanner in response to a request received from the remote scanner. In exemplary embodiments, this communication may be via near-field communication (NFC), BLUETOOTH, WIFI, ZIGBEE, cellular communication, etc. Besides any required hardware, such as a memory to store the received transaction information, etc., the remote scanner may include logic for transmitting the request to the mobile device, receiving the transaction information from the mobile device, and transmitting the transaction information along with other information to the POS terminal via an interface.

The remote scanner may further include logic for applying a plurality of restrictions on the transaction information, such as payment limits, timeouts, allowed purchases, location-based restrictions, etc. The remote scanner may further communicate its status to the POS terminal, which may indicate whether the remote scanner is detached or coupled to the POS terminal. The request for transaction information may specify a format for the transaction information.

The mobile device may include logic for formatting the transaction information according to the format specified in the request. Transmitting the transaction information to the remote scanner may be further subject to user-defined restrictions as specified by one or more of the mobile device and the POS terminal. A network server may approve the transaction remotely by communicating with the POS terminal. Information stored on the network server may include the restrictions above, such as a maximum transaction amount, specific items purchased, and/or a set of standard or custom item tags representing categories of purchases. The remote scanner may further include "self destruct" security features, such as deactivating itself, erasing any sensitive information, etc., which may be activated upon being unable to contact the POS terminal for a specified duration, being subject to an unauthorized or restricted transaction, triggering a restriction such as being moved beyond a geo-fence, etc. These and other security features may render the remote scanner unusable permanently, until the remote scanner re-establishes communication with its associated POS terminal, until the remote scanner may be reformatted, etc. A remote scanner may activate different security features depending on the event, length of time, number of triggered restrictions, etc.

There are many example embodiments of the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

FIG. 1 shows a system for mobile transactions, according to an example embodiment of the subject disclosure. The system may include a POS terminal such as POS terminal 130 having a processor 132, memory 134 with logic 135 stored therein, and a transceiver 136, or any other device that may be used to conduct a transaction, including cash registers, kiosks, subway turnstiles, security barriers, any devices used to authenticate a user and/or receive a payment, etc. Such POS terminals may include processors, memories, or anything else to execute logic for conducting transactions, such as logic 135. The POS terminal may be in wired or wireless communication with a remote scanner, such as remote scanner 120 having logic 125 stored therein. Communication between the remote scanner and the POS terminal, such as POS terminal 130, may be accomplished via any wired or wireless technology, such as WiFi, BLUETOOTH, serial/parallel, USB, etc. In an example embodiment, such as the one shown in FIG. 4, a remote scanner may be coupled to a POS terminal via a cradle wired to a port within the POS terminal. A transceiver, such as transceiver 136, may enable bilateral communication to read information from and write to NFC chips, such as that within remote scanner 120, or any other complimentary communication technology.

The remote scanner may receive instructions from the POS terminal to request transaction information from a mobile device, such as mobile device 100 having logic 114 stored therein. Communication between the remote scanner and the mobile device may be accomplished via any point-to-point wireless communication technology such as NFC, BLUETOOTH, ZIGBEE, WiFi, etc. Consequently, one or both of mobile device 100 and remote scanner 120 may include an appropriate transceiver, such as an NFC chip, RFID chip, smartcards, universal integrated circuit cards (UICC), etc. Further, mobile devices, POS servers, etc., may have more than one transceiver capable of communicating over different networks. For example, a cellular telephone can include a cellular transceiver for communicating with a cellular base station, a WiFi transceiver for communicating with a WiFi network, and a BLUETOOTH® transceiver for communicating with a BLUETOOTH® device.

Both mobile device 100 and POS terminal 130 may further be equipped with the appropriate hardware and logic required to connect to a network, such as network 140. Software may be one example of such logic. Logic may also be composed of digital and/or analog hardware circuits, for example any digital IQ, analog IQ, etc., on a complementary metal-oxide-semiconductor (CMOS), silicon germanium (SiGe), silicon-on-insulator (SOI), etc., and other hardware circuits comprising digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network. For instance, in the present example embodiment, network 140 may provide access to a server 142, having logic 144 stored therein. Network 140 includes broadband wide-area networks such as cellular networks, local-area networks (LAN), and personal area networks, such as near-field communication (NFC) networks including BLUETOOTH®, or any combination thereof. A network typically includes a plurality of elements that host logic for performing tasks on the network.

Figure 9:
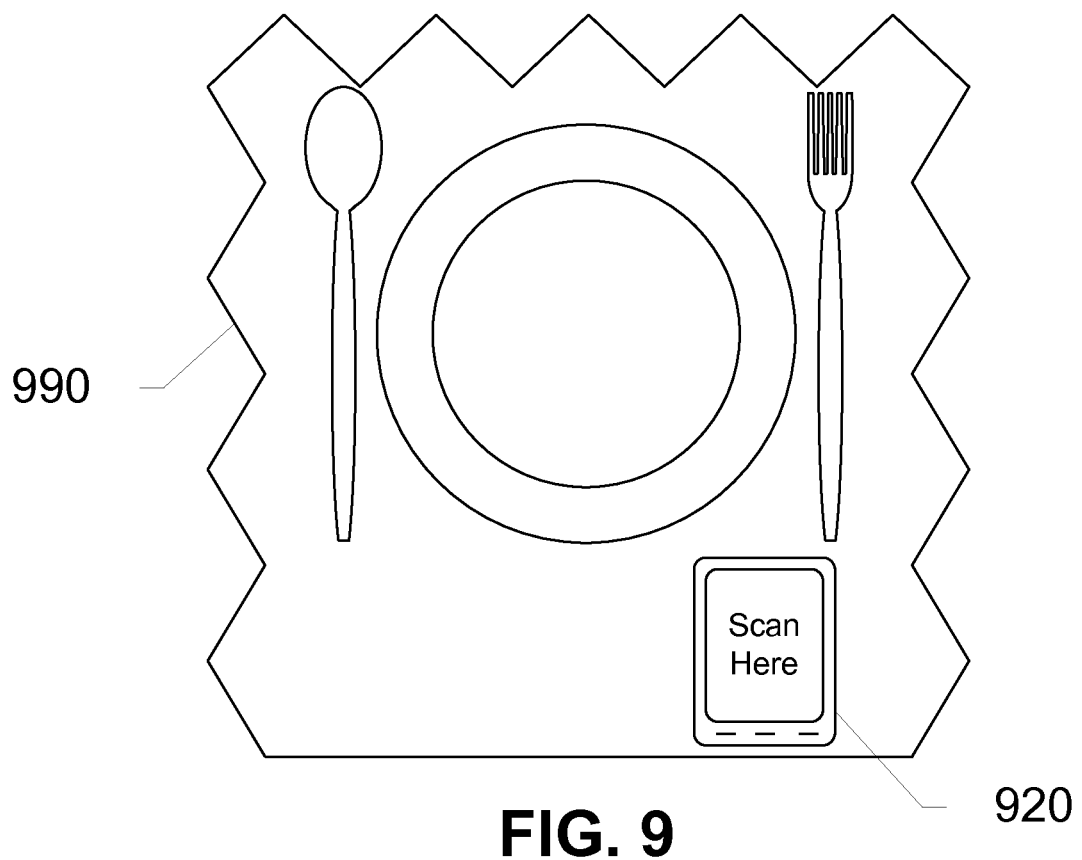
FIG. 9 shows a remote scanner embedded within a dining table, according to example embodiments of the subject disclosure.

In operation, a user of mobile device 100 may decide to perform a transaction with an operator of a POS terminal, such as a vendor who owns and operates POS terminal 130. The transaction may be an authentication or a payment. In other words, POS terminal 130 may be a security barrier protecting a secure item/area, a payment terminal at, for instance, a retail outlet, or any device serving a similar function. To satisfy the transaction, a remote scanner, such as remote scanner 120, may retrieve transaction information from the mobile device 100. For instance, a waiter or staff member at a restaurant may carry a remote scanner 120 to the customer's table to receive payment. A salesman may approach a customer waiting in line to checkout and complete the transaction before the customer reaches the POS terminal 130. A remote scanner 120 may be embedded in the customer's chair or table, as shown in FIGS. 9-10, enabling the customer to complete the transaction without having to move to the POS terminal 130 or relinquish their mobile device 100 containing sensitive payment information to a stranger. In another example embodiment, a remote scanner 120 may be carried by a staff member at a hospital or emergency room, and may be used to request healthcare information and/or medical records from a patient having said information being securely stored in their mobile device 100. In either case, logic 125 on the remote scanner 120 transmits a request for transaction information, including requesting identifying and/or payment credentials/information, from mobile device 100. The transaction information may include personal identification information, credit card number/expiration/security code, bank account information, PAYPAL ID, etc. The transaction information may further include medical records for a patient. A format may be specified by the remote scanner 120, the POS terminal 130, etc. For instance, electronic data interchange (EDI) or Health Insurance Portability and Accountability Act (HIPAA) specific formats may be requested for financial and medical records respectively.

The request may also include an identifier of the POS terminal associated with the remote scanner 120, such as POS terminal 130. The mobile device 100 may include logic 114 for comparing the identifier in the received request with a list of pre-approved POS terminals before transmitting the transaction information to the remote scanner 120. Alternatively, the logic 114 may compare the identifier with a blacklist, in which a positive comparison may result in a denial of the request. Other techniques for verifying an identity of the POS terminal 130 or an entity that operates the POS terminal 130 and remote scanner 120 may become apparent to one having ordinary skill in the art upon reading this disclosure. For instance, a server on a network, such as server 142, may be queried to determine the authenticity of the POS terminal 130. A subscription service may enable a user of the mobile device 100 to subscribe to mobile payments with particular vendors. In such a case, the logic onboard the mobile device 100, such as logic 114, may include instructions for approving the request from the remote scanner 120, packaging the transaction information as per the vendor's requirements, and transmitting the transaction information to the remote scanner 120.

As mentioned briefly above, the remote scanner, such as remote scanner 120, may communicate the received transaction information to an associated POS terminal, such as POS terminal 130. This may happen at different times depending on the context. For instance, a multi-item purchase at one time may simply result in the user being billed and payment being processed upon receiving payment information. Other example embodiments include multi-item purchases over a period of time, whereby the transaction information could be stored but not transmitted to the POS terminal 130 until after the user picks up the last desired item, indicates the last item has been picked up, etc. In a restaurant, the transaction information may be provided to the POS terminal 130 when the user signals to the waiter that they are ready for the bill. A user staying in a hotel may indicate completion of their transaction upon checking out, after which the user's transaction information may be used to process payment for the room in which they stayed, room service items purchased, meals, beverages, office supplies, and any other items or services the user may have used or consumed. Further, each of these items or services may be recorded by a remote scanner 120 at the time that the user purchases/uses them, with the transaction information being stored until the user signals that he is ready to pay.

The transfer of transaction information to the POS terminal 130 may occur upon input from an operator of the remote scanner 120, upon bringing the remote scanner 120 in close proximity to the POS terminal 130, upon connecting the remote scanner 120 to an interface of the POS terminal 130, etc. Other means for transmitting the transaction information are possible. In any case, logic on the POS terminal 130, such as logic 135, may detect the presence of the remote scanner 120 via a transceiver, such as transceiver 136, download the transaction information from the remote scanner 120, and process the transaction information. Processing the transaction information may include executing a payment using payment information within the transaction information, billing a customer by communicating wirelessly with the customer's mobile device, such as mobile device 100, allowing the customer access to a secure area or resource, etc.

Moreover, in example embodiments of the subject disclosure, at least one restriction may be applied to the operation of the remote scanner 120 and the transaction information stored therein. For instance, a timeout onboard the remote scanner 120, a list of authorized or unauthorized POS terminals may dictate with which POS terminals to connect, etc. In these cases, logic onboard the remote scanner 120, such as logic 125, may deactivate any transacting ability until the remote scanner 120 is re-coupled to the POS terminal 130. In alternate embodiments a POS terminal 130 may detect that a restriction could be triggered, and remotely deactivate the transacting ability of the associated remote scanner 120. Further, certain conditions may trigger restrictions that lead to logic 125 erasing any transaction information from the memory of a remote scanner 120. Restrictions may be tiered, i.e., some restrictions may simply deny a transaction, while other restrictions trigger more drastic security measures. For instance, being coupled to an interface of an unauthorized POS terminal 130 may simply cause logic 125 to withhold access, retrieval, or delivery of transaction information until an authorized POS terminal 130 may be detected, while transporting the remote scanner 120 outside of a physical area, such as defined by a geo-fence, may cause logic 125 to erase all sensitive information and deactivate the remote scanner 120 until it may be re-coupled. Finally, when the remote scanner 120 is re-coupled to its associated POS terminal 130, the remote scanner 120 may provide a transaction report, as well as any details of its communication with mobile devices, such as mobile device 100. The transaction report may further include a list of items purchased, prices, any restrictions triggered, transaction, payment, other information, etc. The restrictions may be provisioned by an operator of the POS terminal 130, such as the vendor, a user of the mobile device 100 providing the transaction information, a service provider, and any combination thereof. For instance, mobile device 100 may further communicate the restrictions to server 142 via network 140, with server 142 restricting the transaction if any restrictions are triggered.

There are several types of restrictions on the transaction that may be provisioned on the remote scanner 120. A funds limit or payment amount may be provided to limit purchases to a dollar amount. A time limit or timeout instructs logic 125 to disable transactions after the user-defined limit has passed or the period has lapsed. A list of approved customers/users may be provided to the remote scanner 120 by the POS terminal 130, with corresponding approved identifiers being stored on a memory of the remote scanner 120. Further, a list of approved products or categories of product may be provided, such that the user could not be charged for items she did not intend on buying. Conversely, a list of restricted customer identifiers, products, or categories may be provisioned to indicate to logic 125 to never transact with the restricted customers/items. This may be especially useful for denying access to unauthorized individuals at a security barrier protecting a secure resource. A POS terminal, such as POS terminal 130, may generate a bill including an item list, description, or "tags" for items and provision them to remote scanner 120, as well as submitting them to a server 142 for verification against the restrictions received at the server 142 from a mobile device 100. Keyword limitations may be included to limit purchases based on a name or description generated at the POS terminal 130. For remote scanners enabled with location-based features (such as GPS receivers), location-based limits may also be provisioned. A restaurant owner may program his POS terminal 130 to further provision a temporary PIN or password on the remote scanner 120, and instruct the servers/waiters at his restaurant to input the code on an input of the remote scanner 120 before requesting transaction information from a customer. This ensures that an unauthorized entity who does not know the code could be unable to use the remote scanner 120. The POS terminal 130 may contact the mobile device 100 over a terrestrial or local-area network for permission of the user, an acknowledgement by the user, or entry of a PIN code, before proceeding with the transaction. Further, each restriction may be prescribed a specific action, such as to simply deny a transaction or to shut down the remote scanner 120 altogether. Combinations of these limitations and their associated actions may be possible, along with other restrictions that would become apparent to those of ordinary skill in the art in light of this disclosure.

In other embodiments, it is not necessary for either the mobile device 100 or the POS terminal 130 to access a network server 142 to communicate or enforce restrictions. The logic for verifying restrictions may be distributed among the mobile device 100, the remote scanner 120, and the POS terminal 130. Alternatively, the POS terminal 130 may communicate with the mobile device 100 across a local area network (LAN) and provide transaction confirmations locally. In other embodiments, the mobile device 100 and/or the POS terminal 130 provision restrictions directly to the network server 142. In such a scenario, the POS terminal 130 may receive transaction information from the remote scanner 120, and transmit a list of purchased items and descriptions to the server 142 that may determine whether or not to approve the transaction. Alternatively, combinations of restrictions may be programmed onto both the remote scanner 120 and the server 142 for a more dynamic transaction mechanism. Other configurations of the distribution of the logic will become readily recognizable to those having skill in the art upon reading this disclosure.

A successful transaction, i.e., one that may not be subject to any restrictions, may lead to the POS terminal 130 receiving the transaction information, verifying the transaction information with server 142 via network 140, and processing the transaction. Once the transaction information is verified, server 142 may confirm the transaction with POS terminal 130, and POS terminal 130 in turn may provide a confirmation to mobile device 100. The confirmation may include a receipt, a transaction report, and/or any other details about the transaction. The confirmation may further be uploaded to a server, such as a payment or account server associated with the user's account provided in the transaction information. Meanwhile, remote scanner 120 may disable itself, and/or erase any transaction information, until it may be ready to perform a new transaction. Further, communication with a server is not necessary to confirm a transaction. A user may be billed by the POS terminal 130 communicating with the mobile device 100 itself, via a local or terrestrial network, and a user account onboard the mobile device 100 may be debited upon the POS terminal 130 receiving transaction information from the remote scanner 120.

Figure 2:
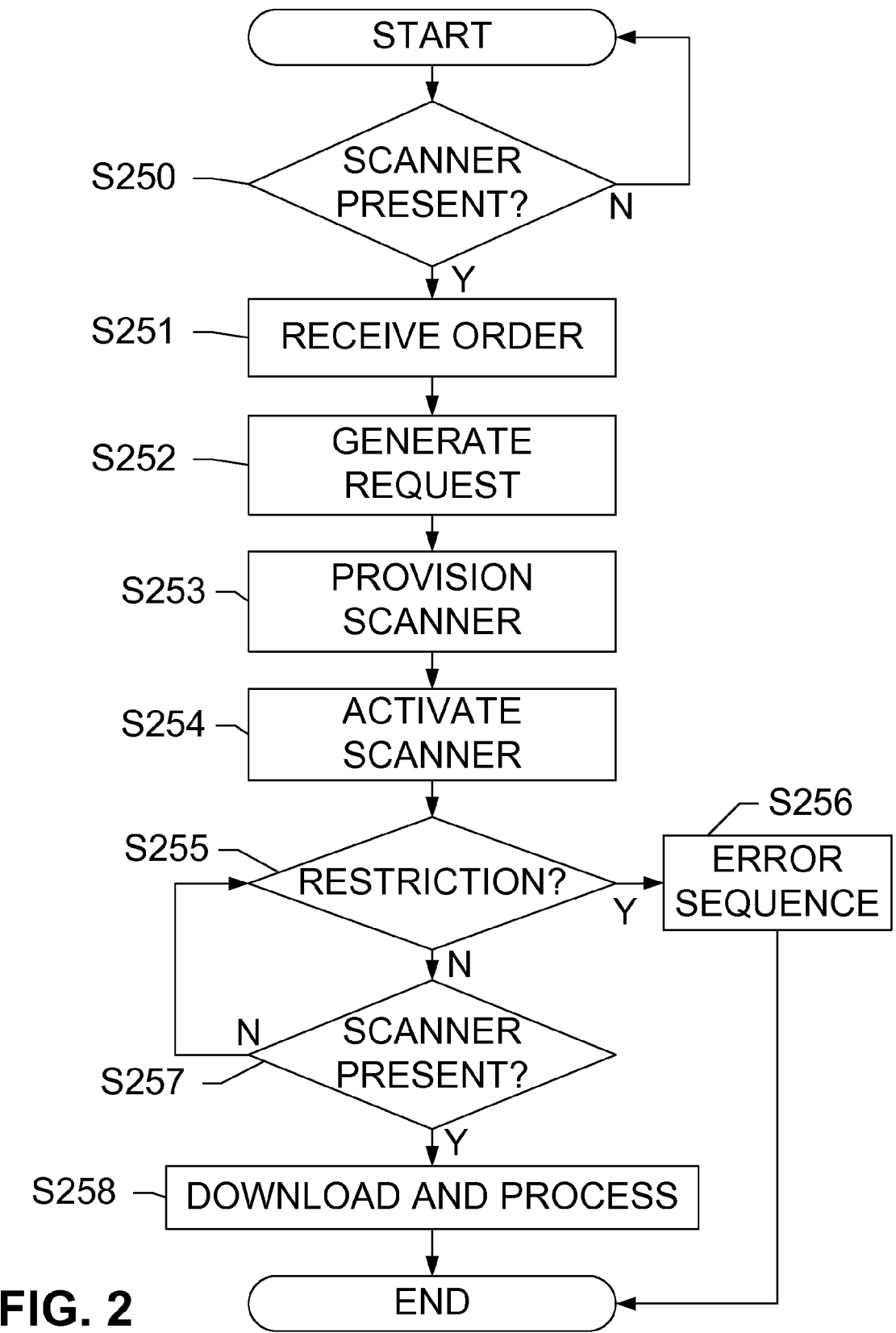
FIG. 2 shows a method for generating a request at a POS terminal, according to an example embodiment of the subject disclosure.

FIG. 2 shows a method for generating a request at a POS terminal, according to an example embodiment of the subject disclosure. The method begins with a POS terminal attempting to communicate with a scanner (S250). If the scanner is not present, the POS terminal may continue waiting until the remote scanner becomes present. This determination may occur via a variety of methods disclosed herein, such as determining a proximity of the remote scanner, detecting electrical communication with a remote scanner (for instance, by a waiter plugging a remote scanner into an interface), etc. A switch on a cradle may be depressed as the remote scanner is coupled, and lifted as the remote scanner is decoupled. Since the remote scanner may have to be present for the information to be programmed onto it, the POS terminal may wait for the remote scanner to be plugged in or detected. Further, function S250 is optional as it may be pre-programmed into the POS system that a transaction may be initiated without a remote scanner being present. Thereafter, an order is programmed into POS terminal (S251). The order may be any one of the transactions disclosed herein, such as a request for security authentication, a purchase, a banking transaction at a teller or ATM, etc. In either case, receiving the order (S251) may indicate to the POS terminal that transaction information may be needed to complete the transaction. Consequently, the POS terminal may generate a request for transaction information (S252). The request may include at least one identifier of the POS terminal, a format for the requested information, transaction details, etc. For instance, the transaction may include a bill of items listed in the order received at function S251. Further, the request generated at function S252 may include an indicator of a desired format for the request. For instance, transaction information may be requested in a text-based format such as XML, CSV, etc. A form may be included with the request, the form having readily identifiable fields for specific types of information such as credit card information, medical records, passwords, etc. Other data may be included within the request.

The request may then be provisioned or programmed onto the remote scanner via an interface (S253). Any of the disclosed methods for coupling the remote scanner to the POS terminal may be employed to fulfill function S253, such as wirelessly programming a NFC tag on the remote scanner, transmitting the request via USB, serial, or any proprietary or commonly-used interface or electrical contact interface, a docking cradle, etc. In addition to the request, a copy of the order or a generated bill may be included in provisioning function S253. Moreover, a plurality of restrictions may be included in provisioning function S253. These restrictions may include a dollar amount in the account, a time limit, a geographical restriction, etc. These may also include previous restrictions defined by an operator of the POS terminal such as limiting access to a particular user/employee of the operator, limiting a number of transactions, limiting the type of transaction information able to be stored, etc.

The remote scanner may then be activated for use (S254). Function S254 may include disconnecting or decoupling the remote scanner from the POS terminal. Function S254 may further include actively commanding the remote scanner to enter an activated mode before said decoupling. Alternatively, function S254 may simply resolve automatically upon completion of provisioning function S253. Therefore function S254 can be construed as optional, passive, etc. In either case, i.e., upon being provisioned (S253) or upon being activated (S254), the remote scanner now monitors for a presence of a restriction, and a presence of a mobile device from which to request transaction information. For instance, FIG. 3 describes an example embodiment of functions carried out by an activated or provisioned remote scanner. Briefly, these include monitoring for a restriction, i.e., observing a geographical limit such as a geofence, counting a timer, detecting a presence of a mobile device, receiving transaction information from the mobile device, etc.

Referring back to FIG. 2, the POS terminal may also monitor for a presence of a restriction (S255). For instance, the POS terminal may receive a distress signal from the remote scanner, detect that the remote scanner has been transported outside of a geographical range or geofence, etc. Further, the POS terminal may include a timer that expires before the return of the remote scanner carrying transaction information. Other restrictions described herein may be triggered. If a restriction is detected or triggered, then an error sequence may be initiated (S256). The error sequence may include several steps to defend against a potentially caustic situation, such as disabling transaction abilities of the remote scanner, remotely disabling or "bricking" the remote scanner, sounding an alarm, notifying an operator of the POS terminal, etc. Other defensive functions are possible within function S256. In some example embodiments, while the remote scanner is decoupled from the POS terminal, the POS terminal may broadcast a continuous signal or beacon, and receive updates from the remote scanner. This may use a minimal data transfer. For instance, the remote scanner transmits back to the POS terminal a series of text-based codes indicating its status. Any codes out of the ordinary may indicate an error, and can be used to alert the user that the remote scanner may be compromised, or that a restriction may have been triggered. This enables the user to take defensive actions via the mobile device, or by alerting the vendor. The remote scanner itself may have a cellular transceiver incorporated within it. This adds several additional features for communicating between the mobile device and the remote scanner, as well as between the remote scanner and the network. The remote scanner may communicate its status to the mobile device via a network such as network 140, which may include a private network, a public network such as the Internet, a cloud network, or any combination thereof. A user can remotely "brick" or disable the remote scanner by sending a command to the network via the mobile device or any other device which can communicate with the network. Further, restrictions may be updated dynamically in real time while the remote scanner is decoupled. Status and restriction communication may also be possible with remote scanners that communicate across local area networks. If no restrictions are triggered, then the process continues.

Meanwhile, the POS terminal also monitors the radio environment and/or the interface to determine if the remote scanner has returned (S257). This occurs in a manner similar to that of function S250, i.e., a determination that the remote scanner may be within proximity of the POS terminal, electrically coupled to the POS terminal, placed in a cradle, etc. Upon determining that the remote scanner has returned, the POS terminal may initiate a download sequence (S258). This may include retrieving transaction information from the remote scanner, as well as any additional information provided by the remote scanner. For instance, the remote scanner may include a report of its activities and an identifier along with the transaction information. These activities may include a number of transactions performed, timestamps, historical location information, any restrictions/errors encountered, details of communication with any mobile devices, etc. Function S258 further includes processing any transaction details to satisfy a transaction. This may include contacting a payment server across a network, submitting relevant transaction information to the payment server, receiving confirmation from the payment server, providing the confirmation to the remote scanner, providing a confirmation to the mobile device of the customer, etc. Communication between the POS terminal and the mobile device or between the POS terminal and the remote server, may occur via any wired or wireless connection, such as cellular, wireless broadband, Wi-Fi, LAN, femtocell, etc. Any residual or remaining transaction information may be erased from the remote scanner (and possibly the POS terminal) upon a determination that the transaction has been fulfilled. Processing function S258 may also include the steps of notifying the customer's mobile device and/or an operator of the POS terminal if any difficulties arise in fulfilling the transaction, such as an invalid account, insufficient funds, triggering of any restrictions, etc.

Figure 3:
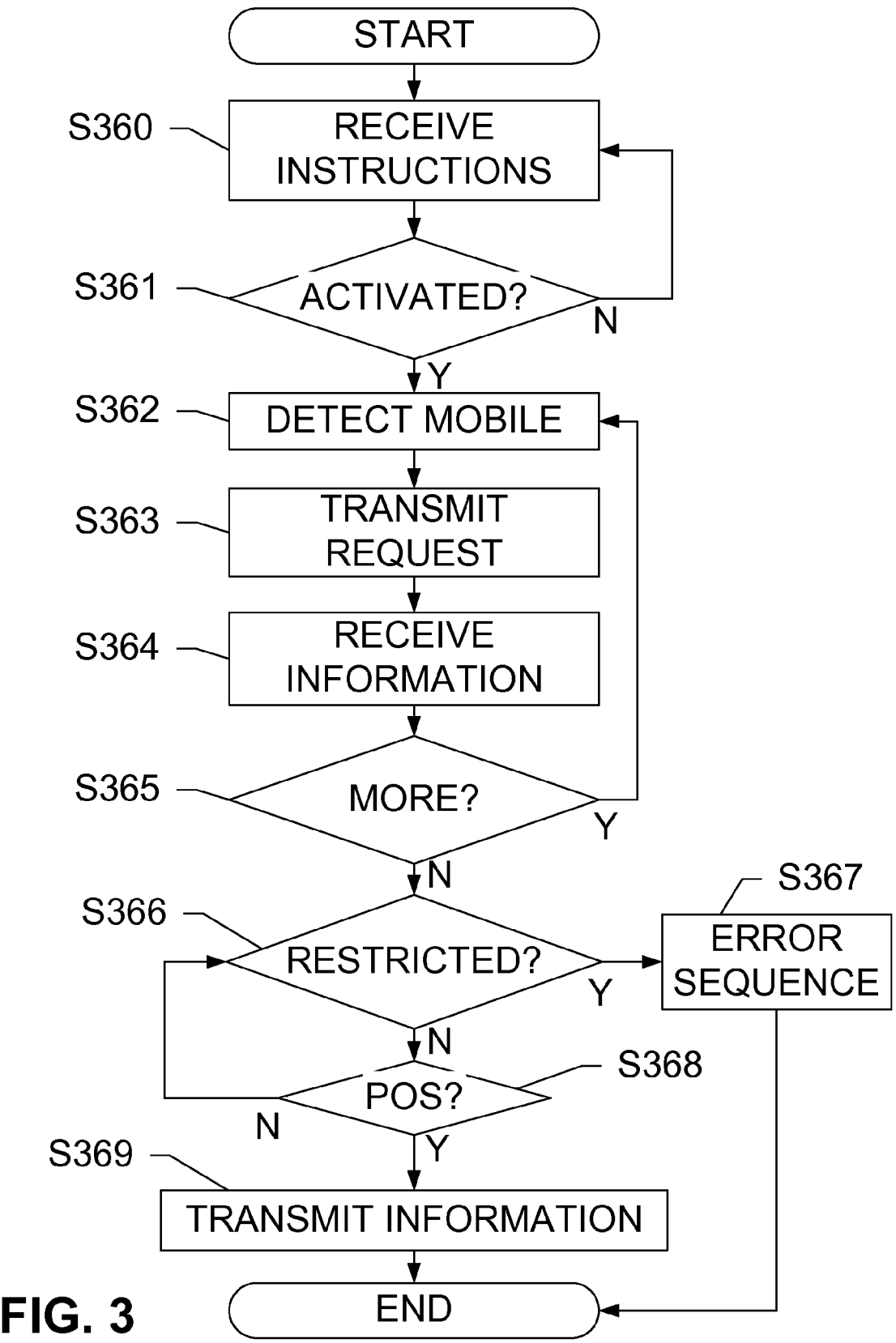
FIG. 3 shows a method for requesting transaction information from a mobile device, according to an example embodiment of the subject disclosure.

FIG. 3 shows a method for requesting transaction information from a mobile device, according to an example embodiment of the subject disclosure. The method begins with a remote scanner being coupled to a POS terminal, and receiving instructions from the POS terminal (S360). For instance, the POS terminal may have generated a request for transaction information, as discussed with respect to FIG. 2. Besides an identifier of the POS terminal, a format for the requested information, and transaction details, the transaction may include a bill of items sold as well as an indicator of a desired format for the request. Moreover, a plurality of restrictions may be included in the provisioning function S360. These restrictions may include a dollar amount in the account, a time limit, a geographical restriction, etc. These may also include previous restrictions defined by an operator of the POS terminal such as limiting access to a particular user/employee of the operator, limiting a number of transactions, limiting the type of transaction information able to be stored, etc. Alternatively, some of these instructions/restrictions may be pre-programmed into the remote scanner, depending upon the vendor or operator's preferences. In either case, the request and additional instructions may be provisioned or programmed onto the remote scanner via an interface. Any of the disclosed methods for coupling the remote scanner to the POS terminal may be employed, such as wirelessly programming an NFC chip on the remote scanner, transmitting the request via USB, serial, or any proprietary or commonly-used interface or electrical contact interface, a docking cradle, etc.

The remote scanner may then be activated for use (S361). Function S361 may include disconnecting or decoupling the remote scanner from the POS terminal. Function S361 may further include actively commanding the remote scanner to enter an activated mode before decoupling. Alternatively, function S361 may simply result automatically upon completion of receiving instructions during function S360. Therefore this step can be construed as optional, passive, etc. In either case, if activation is not detected at the remote scanner, it may await further instructions from function S360. Upon being activated (S361), the remote scanner may now monitor for a presence of a mobile device from which to request transaction information (S362). Throughout its time being activated, the remote scanner may additionally monitor for any triggering of a restriction (S366), as further described below. Meanwhile, upon detecting a mobile device of a customer or user (S362), the remote scanner transmits a request for transaction information (S363) to the mobile device. As explained in detail herein, this request may include a bill, a POS identifier, a preferred format, and other information. The request may be transmitted via an NFC query, or other short-range wireless communication. Upon receiving the request, the mobile device undergoes a series of processes such as verifying a POS identity, launching a mobile wallet application, contacting a remote server, generating/compiling transaction information according to the desired format specified in the request, etc., and ultimately transmitting the transaction information to be received by the remote scanner (S364). User input may be required at the mobile device before the transaction information is transmitted. Further, the mobile device may transmit user-defined restrictions to potentially be applied to the transaction information in addition to the restrictions defined by the vendor or operator of the POS terminal, such as spending limits, item restrictions, timeouts, etc.

Once transaction information may be received, the remote scanner may be returned to the POS terminal to deliver the transaction information, or may be used to perform additional transactions (S365). For instance, a remote scanner may include a plurality of memory banks to store transaction information from a plurality of mobile devices. This would be useful in a restaurant setting where a waiter receives payments from several tables before returning the remote scanner to the POS terminal. If more transactions need to be performed (S365), then further detections of mobile devices may be performed (S362), with request transmittals (S363) and receiving information (S364) being performed as described above. If no more transactions need to be performed, then the remote scanner continues towards the POS terminal. Moreover, as described above, the remote scanner continues to monitor for a trigger of any restriction that may be applied to the transaction information stored therein, or for any restrictions that may be applied to the remote scanner itself S366. For instance, an internal clock may monitor for a timeout starting from when the remote scanner was decoupled from the POS terminal. A remote scanner with GPS and a power supply may be able to constantly monitor its location. For remote scanners without power supplies, the restrictions may be acted upon at the time the remote scanner detects or is brought within close proximity of a POS terminal using inductive power S368. In such a case, steps S366 and S368 need not occur in series, they may occur simultaneously or in any order. In either case, detection of a restriction may invoke an error sequence S367, including but not limited to erasing transaction information, disabling transacting abilities, alerting an operator of the POS terminal, alerting the mobile device, sounding an alarm, etc.

The remote scanner may further detect a presence of or a coupling to a POS terminal S368, for instance by being placed in a cradle wired to the POS terminal. Upon such a determination, the remote scanner may initiate a transmittal sequence S369. This may include transmitting transaction information to the POS terminal, as well as any additional information provided by the remote scanner. For instance, the remote scanner may include a report of its activities and an identifier along with the transaction information. These activities may include a number of transactions performed, timestamps, historical location information, any restrictions/errors encountered, details of communication with any mobile devices, etc. This may further include providing a confirmation to the mobile device of the customer. Communication between the remote scanner and the mobile device may occur via any wireless connection, such as cellular, wireless broadband, Wi-Fi, LAN, femtocell, etc. Any residual or remaining transaction information may be erased from the remote scanner (and possibly the POS terminal) either upon a completed transmittal, or upon a determination that the transaction has been fulfilled.

As described above, communication between the remote scanner and the POS terminal may be wired or wireless. In the case of wired communication, detection of the presence of the remote scanner could be determined via electrical communication with the remote scanner, and/or communication with one or more components of the remote scanner as it is "plugged in" to be detected by the mobile application. The remote scanner may be activated (ready to perform a transaction, in other words) when it is unplugged from the POS terminal. In the case of wireless communication, a transceiver onboard the POS terminal may sense the proximity of the remote scanner. In some embodiments, a mechanical switch may additionally or alternatively be utilized to clearly indicate to the POS terminal whether the remote scanner is coupled or not. Several combinations of wired and wireless remote scanners having transceivers, power supplies, and other features are possible.

Figure 4:
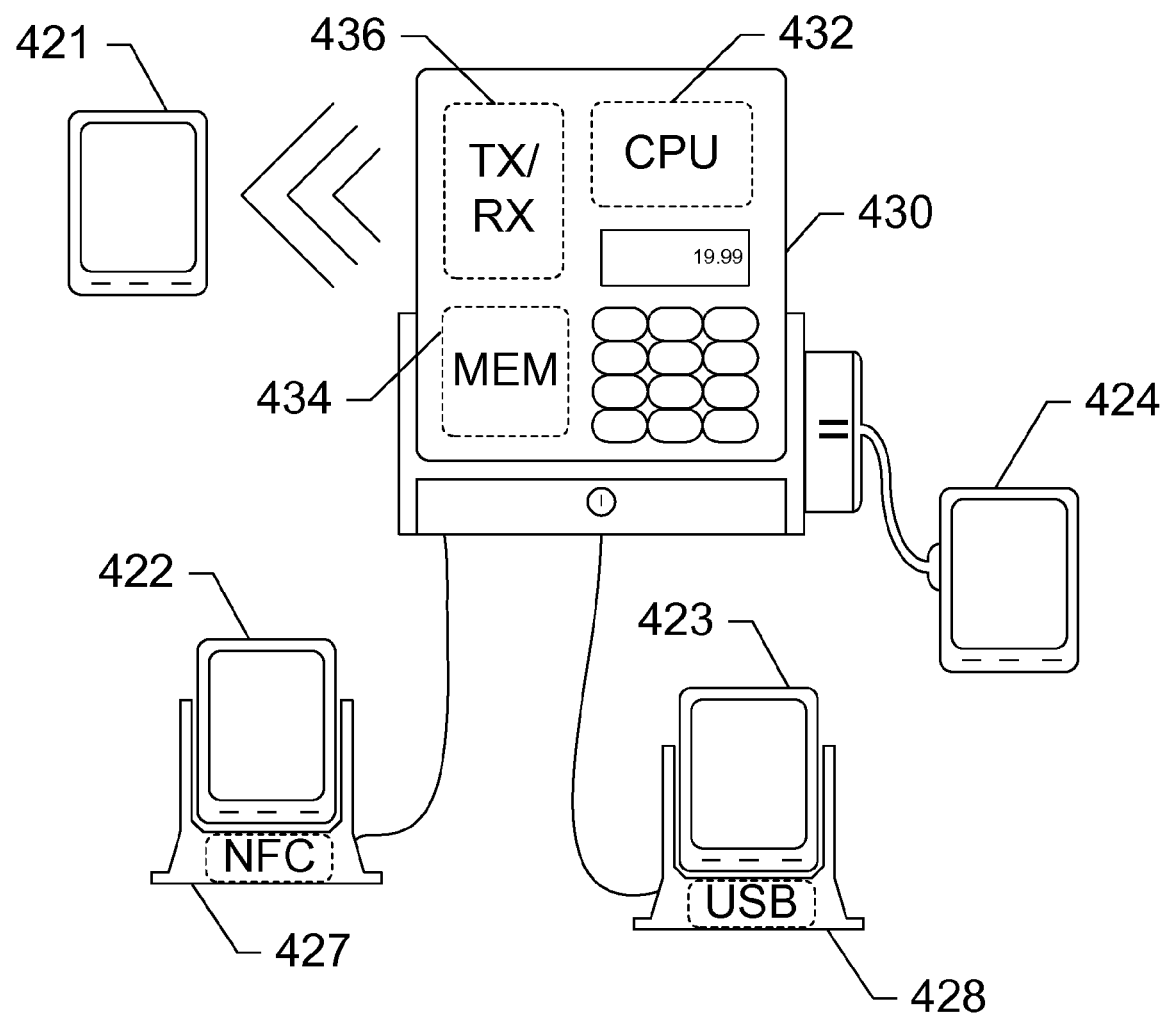
FIG. 4 shows a POS terminal, according to an example embodiment of the subject disclosure.

FIG. 4 shows a POS terminal including a plurality of remote scanners, according to an example embodiment of the subject disclosure. POS terminal 430 may include a processor 432, memory 434 with logic stored therein, and a transceiver 436. The POS terminal 430 may include any device that could be used to conduct a transaction, including cash registers, kiosks, subway turnstiles, security barriers, or any other device used to authenticate a user and/or receive a payment. The POS terminal 430 may be in wired or wireless communication with a plurality of remote scanners, such as remote scanners 421-424. Communication between the remote scanners 421-424 and the POS terminal 430, may be accomplished via wired or wireless technology, such as WiFi, BLUETOOTH, serial/parallel, USB, etc. In an example embodiment, such as the one shown in FIG. 4, remote scanner 421 communicates with the POS terminal 430 via a wireless connection such as NFC, BLUETOOTH, etc. Remote scanners 422 and 423 may be coupled to the POS terminal 430 via a cradle wired to a port within the POS terminal 430. For instance, cradle 427 includes an NFC transceiver enabling wireless communication with remote scanner 422. This type of cradle 427 need not electrically coupled with the remote scanner 422; instead it retrieves transaction and other information from remote scanner 422 by reading an NFC tag on the remote scanner 422, and delivers the information to POS terminal 430 via an interface cable. Alternatively, cradle 428 includes a USB connector that couples to a USB port on remote scanner 423. Cradle 428 may retrieve transaction information from the memory onboard remote scanner 423 and transmit the information to POS terminal 430 via an interface cable. Cradle 428 may simply be a "dumb" device, physically designed to hold and secure remote scanner 423, but otherwise merely providing electrical connectivity between a USB port on remote scanner 423 and a USB port on POS terminal 430, enabling data transfer between the two. Finally, remote scanner 424 may communicate with POS terminal 430 via a data interface including any proprietary or open known or future interface, such as universal serial bus (USB), equivalents, and variants thereof. For each remote scanner 421-424, when coupled to a POS server, logic on the POS server transmits bills, requests, restrictions, etc. to provision the remote scanners 421-424, and retrieves transaction and other information from the remote scanners 421-424. When the remote scanners 421-424 are decoupled, they may further communicate with the POS terminal 430 via a wireless network as described herein.

Although specific features have been shown in the POS terminal of FIG. 4 in specific physical forms, it should be noted that any combination of these features may be included in any of the disclosed physical forms. Further, it is conceivable that other physical forms and combinations of features are possible, and potentially apparent to one having ordinary skill in the art in light of this disclosure, while maintaining the novelty of the features disclosed herein. For instance, a battery-powered remote scanner may be provided without any data interfaces. In such a situation, it can be conceived that the battery charges itself via induction from the power supply of the POS terminal. A timeout may be refreshed via a separate NFC reader. For example, a decoupled remote scanner could be used to retrieve payment information from patrons of a restaurant. The waiter may be unsure how many customers he must take care of before returning the remote scanner to the POS, so he regularly swipes the remote scanner at NFC readers provided at convenient locations within the restaurant.

This ensures that the remote scanner remains activated, and may also be used to maintain a charge on a battery of the remote scanner via induction. Generally, any adaptation to the remote scanner to fit the tremendous variety of POS terminals and mobile devices on the market today and in the future is well within the scope of the subject disclosure, with the disclosed embodiments being merely representative of the potential diversity of possibilities. Certain embodiments of the remote scanner remain in communication with the POS terminal while decoupled. This may require additional hardware components, including transceivers, batteries, etc. These embodiments may be particularly useful for high-security applications such as keys to restricted access areas, vaults, deposit boxes, etc. Stronger transceivers may utilize different communication technologies such as WiFi, BLUETOOTH, WiMAX, LTE, Zigbee, other IEEE 802.XX protocols, etc., which will be readily recognizable by those having skill in the art upon reading this disclosure.

Figure 5A:
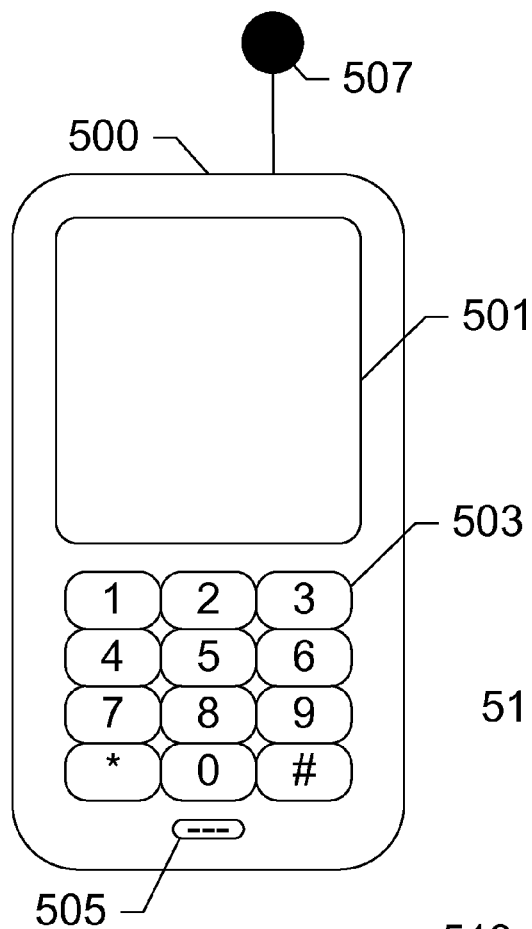
FIGS. 5A-5B show external and internal components of a mobile device, respectively, according to an example embodiment of the subject disclosure.
Figure 5B:
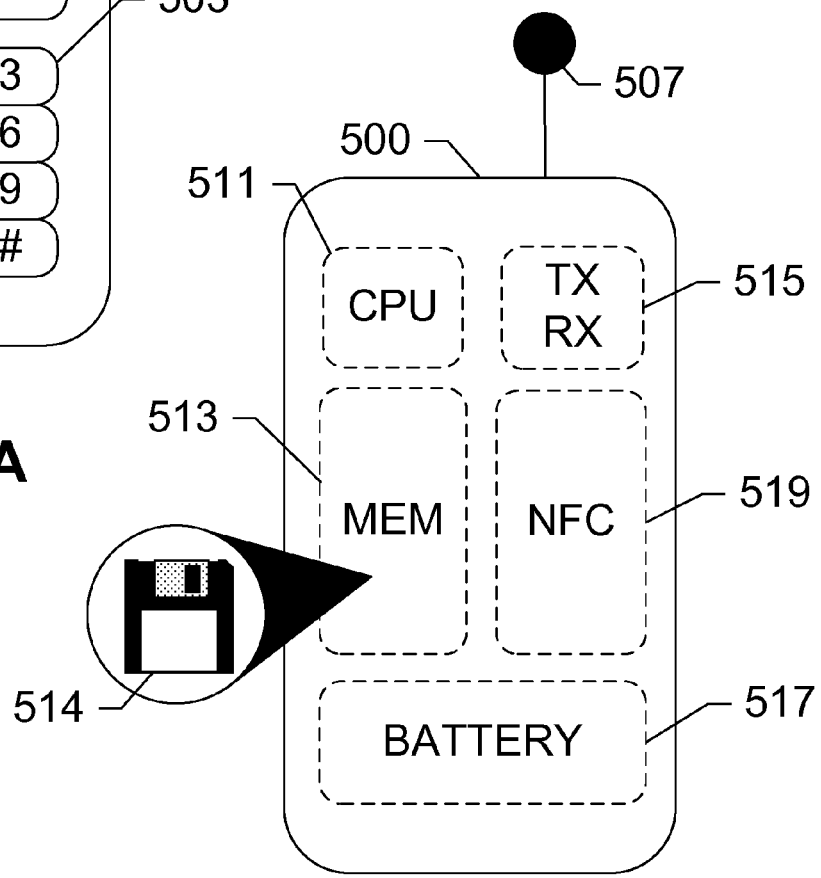

FIGS. 5A-5B respectively show external and internal components of a mobile device, according to an example embodiment of the subject disclosure. The mobile device may generally refer to any electronic device capable of wirelessly sending and receiving data, such as cellular telephones, smart phones, personal digital assistants (PDAs), portable computers, etc. With reference to FIG. 5A, mobile device 500 may include a display 501, a keypad 503, a microphone 505, and an antenna 507. Display 501 may be a liquid crystal display (LCD) that serves as a visual output for the user. Display 501 may be used to display a user interface for an operating system, as well as notifications of service offers and service changes. Keypad 503 may be an input for entering information and commands to mobile device 500. Microphone 505 may accept aural input and allow mobile device 500 to deliver voice communication to the network and other mobile devices. Antenna 507 may be a transducer for transmitting and receiving wireless radio frequency (RF) signals to and from wireless networks, network nodes, and other wireless devices.

With reference to FIG. 5B, inner components of mobile device 500 may include one or more of a processor 511, one or more of a memory 513 storing a logic 514 along with additional logic, a transceiver 515, a battery 517, and an NFC reader 519. Processor 511 may receive input and issues commands to deliver output through the other components. Examples of processors may include computer processors (processing units), microprocessors, digital signal processors, controllers and microcontrollers, etc. Memory 513 may store information including logic 514 for enabling processor 511 to operate the other components of mobile device 500. Examples of memories may include RAM (random access memory), flash memories, ROMS (read-only memories), EPROMS (erasable programmable read-only memories), EEPROMS (electrically erasable programmable read-only memories), or any other storage device or medium. Transceiver 515 may convert wireless signals received by antenna 507 to information capable of processing by processor 511, and vice-versa, and to communicate with a network and other mobile devices. Battery 517 may power mobile device 500, and may be rechargeable via an external power source. Logic 514 may further include a payment application that uses NFC reader 519 to read from and transfer information to a remote scanner, as described herein. For instance, logic 514 may include instructions to receive a request for transaction information from a remote scanner, verify an identity of the remote scanner or a POS associated with the remote scanner against an onboard database stored on memory 513 or an online database, and transmit the transaction information to the remote scanner. Logic 514 may further include instructions for formatting the transaction information according to a format specified within the request, as well as to launch a mobile payment application, such as a mobile wallet, enabling a customer to select an account and/or other payment information to be included with the transmitted transaction information.

There are many embodiments of a mobile device that are capable of being used in accordance with the subject disclosure. In other embodiments of the mobile device, other displays are used, such as an LED display, OLED display, etc. In some embodiments, the display could be used as a touch-sensitive input device, i.e., a touch screen. A touch screen allows the user to view output on the display as well as use the display to provide input. In some touch screen embodiments the mobile device may not have a physical keypad for input. Instead, a virtual keypad may be displayed on the touch screen and the user inputs by touching the virtual keys. Other forms of input such as full keyboards, accelerometers, motion sensors, etc., may be utilized in the mobile device. The memory may be a non-removable internal memory, or a removable memory coupled to a SIM card or a memory card inserted into a memory card reader. Many mobile devices have more than one transceiver or a transceiver that supports more than one protocol. For instance, it is not uncommon for a mobile device to support cellular radio frequency (RF), GSM, GPRS, UMTS, W-CDMA, LTE, NFC, WiFi, BLUETOOTH®, ZIGBEE®, and Z-WAVE® protocols. A mobile device involving multiple modes of wireless communications, such as cellular, WiFi, NFC, etc., may contain a plurality of antennas on a single device. For example, an NFC-enabled mobile device has separate antennas for cellular and NFC communications respectively.

Figure 6:
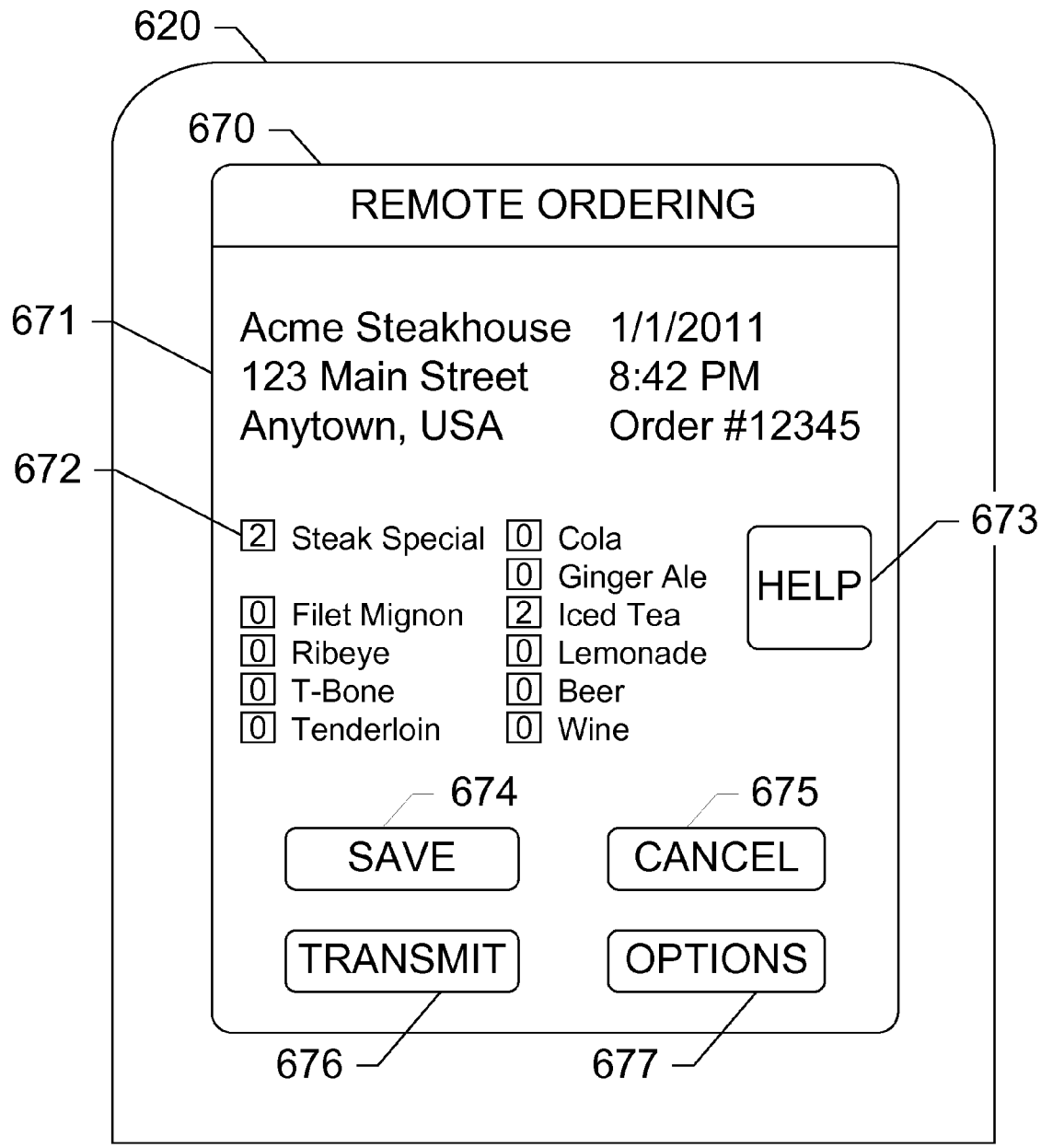
FIG. 6 shows an order on a remote scanner, according to an example embodiment of the subject disclosure.

FIG. 6 shows an order on a remote scanner, according to an example embodiment of the subject disclosure. The order may be received by a customer seated at a table in a restaurant, with remote scanner 620 being operated by a waiter. The waiter may record the order via a remote ordering program 670 displayed on a display of remote scanner 620. Remote ordering program 670 may be installed on a memory of remote scanner 620. Remote ordering program 670 may include general information 671, such as the name and address of the restaurant along with the date, time, and an order number. Remote ordering program 670 may further include the items available for order with boxes next to each item. In case the customer wants more than one of the items, the waiter may input a quantity into the box next to that item on the bill. In this example embodiment, "Steak Special" is at the top of the menu with a quantity of "2" in the box 672 to the left. This means the customer intends to order two "Steak Specials". Once the waiter has input the quantity of items to order, the waiter may push "Save" button 674 to store the order before submitting or transmitting the order to a POS terminal. The order may need to be saved in case the waiter intends on receiving more orders from multiple tables at the restaurant using the same remote scanner 670. If the customer changes their mind, or if the waiter needs to cancel the order, then cancel button 675 may be activated. A help button 673 may be activated in case the customer needs further assistance, such as speaking to a manager. When the waiter is ready to transmit the order to a point of sale terminal, for instance when remote scanner 620 may be coupled wirelessly or electrically to a POS terminal, the waiter may activate "transmit" button 676. Alternatively, "transmit" button 676 wirelessly transmits the order to a POS terminal or to any electronic ordering system/network in place at the restaurant. Finally, the waiter may activate "Options" button 677, perhaps in order to select advanced options for customers on special diets, or to add notes to the order. Buttons 674-677 are shown on a touch-screen display of remote scanner 620. However, they may be activated by manipulating a keypad, accelerometer, or any other input available on the remote scanner.

In other example embodiments, sub-menus and options to link, order, and/or receive payment information are also available for selection within the menu. To access a sub-menu or link another bill, a button corresponding to the sub-menu can be activated through the keypad, a touch screen, or other input of the remote scanner 620.

Figure 7A:
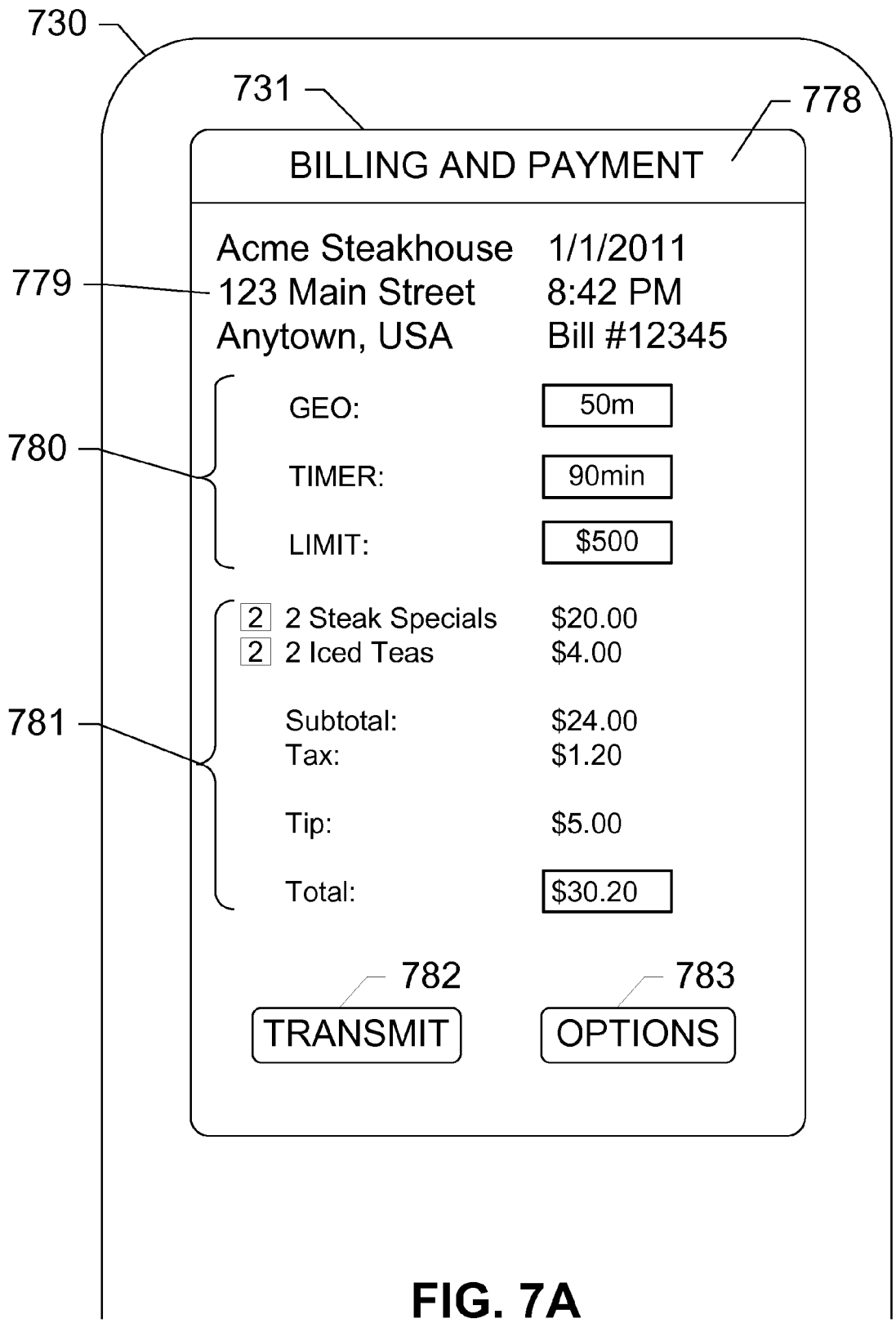
FIGS. 7A-7B show a bill on a POS terminal, according to example embodiments of the subject disclosure.
Figure 7B:
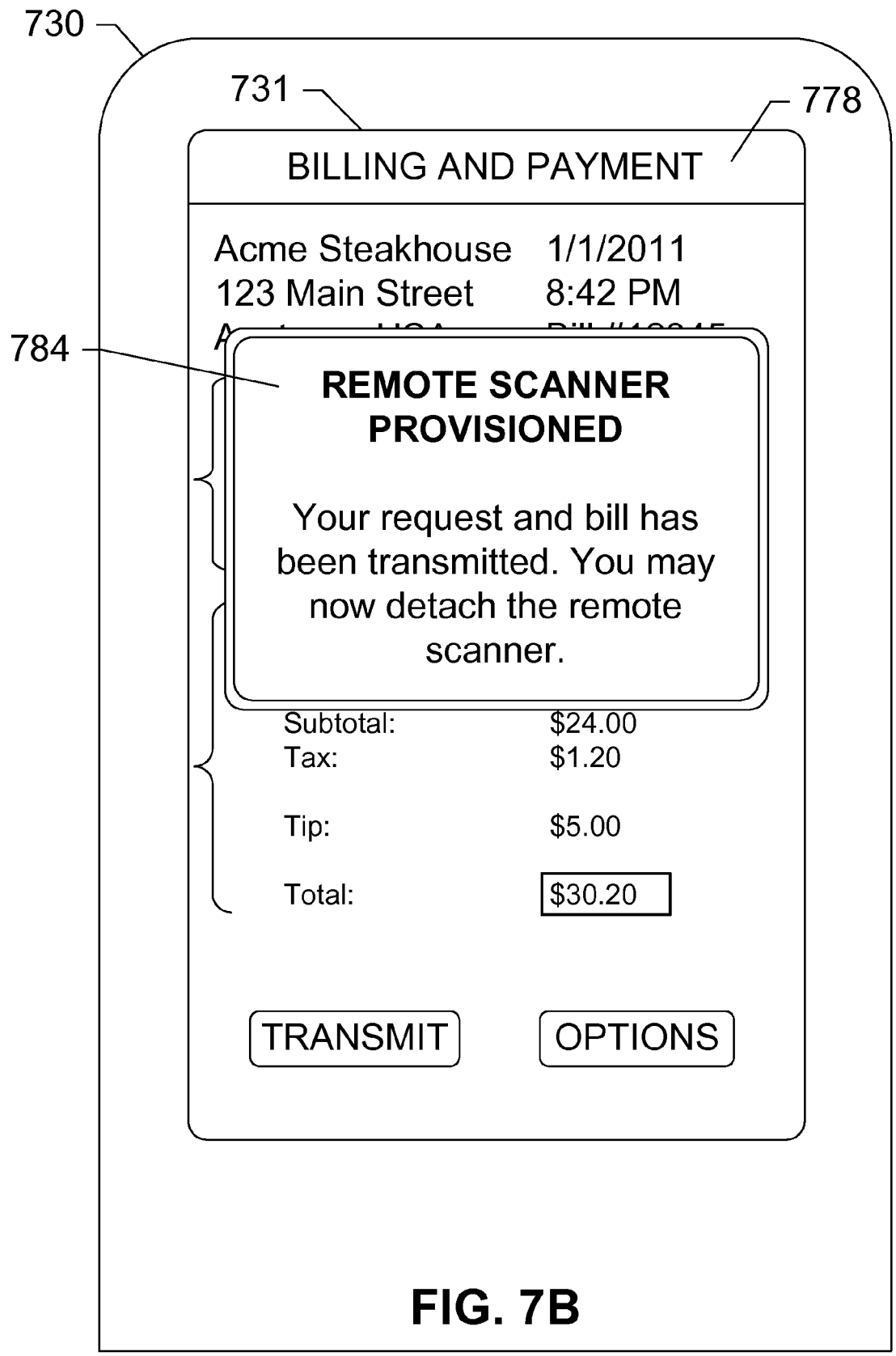

FIGS. 7A-7B show a bill on a POS terminal, according to example embodiments of the subject disclosure. In this example embodiment, POS terminal 730 may include a display, such as display 731. Display 731 may be a touch-sensitive screen. Not shown are other possible input devices on POS terminal 730, such as a keyboard, etc. Display 731 may show a billing and payment application 778 for generating a bill for a customer and transmitting the bill along with a request for transaction information to a remote scanner coupled to the POS terminal 730. Billing and payment application 778 may include general information 779, such as the name and address of the restaurant along with the date, time, and bill number. Billing and payment application 778 may further include restrictions 780 to be provisioned on the remote scanner, including but not limited to geographical restrictions (i.e., a geofence), a timer, and a maximum amount limit. Other restrictions may be included by activating options button 783. Further, a bill 781 includes menu items ordered with a quantity next to each item, as well as a subtotal and total amount to be billed to the customer. For example, if a customer only wants to pay for a portion of the total, the waiter may input a quantity less than the total quantity of that item on the bill. A tip may be automatically set to 10%, 15%, 20%, etc., or manually set by the customer. When the bill is ready, the waiter may activate the transmit button 782 to transmit the bill along with a request for transaction information to a remote scanner. This may command POS terminal 730 to seek for the presence of the remote scanner via its wireless transceiver, or scan its interface ports for the presence of the remote scanner. Alternatively, "transmit" button 782 may be de-activated until the remote scanner is coupled to the POS terminal 730. Further, the waiter may activate "options" button for several purposes, such as adding/removing restrictions, changing the preferred format of the transaction information, etc. Buttons 782 and 783 may be activated by manipulating the keys of a keypad of POS terminal 730 (not shown) or by any other input that may be available such as touch screen technology, accelerometer input, etc. Taxes may be added automatically or provided as an additional amount, depending on the jurisdiction.

FIG. 7B shows a result of pushing the transmit button 782, according to an example embodiment of the subject disclosure. Upon activation of the "transmit" button, POS terminal 730 transmits all necessary information to the remote scanner via any of the exemplary interfaces described herein, including wired and wireless interfaces. When the transmittal is complete, a notification 784 may be shown on display 731, informing the waiter that the remote scanner has been provisioned and could be ready for use. The waiter may now detach or decouple the remote scanner from POS terminal 730 and transport it over to the customer in order to request transaction information from a mobile device of the customer.

As described herein, the remote scanner communicates with a customer or user's mobile device to request and receive transaction information subject to a plurality of restrictions. When coupled to or in communication with a POS terminal 730, the remote scanner transmits the transaction information to the POS terminal 730 for further processing. This further processing may include communicating with a payment server to validate the transaction, determine if any restrictions are present, etc. The server may validate the transaction based on one or more factors, such as comparing a current balance to an amount restriction, or by identifying malicious or unauthorized vendors/POS terminals. A geofence and/or a timeout may additionally be enforced by the server, which communicates its results back to the POS terminal. This communication may occur via any wireless connection between the server and the POS terminal 730, such as cellular, wireless broadband, Wi-Fi, LAN, femtocell, WiMAX, etc. The confirmation may verify that funds are available, and that the transaction is not limited by some other factors. The server may also communicate a transaction confirmation to the mobile device. The additional confirmation provides a redundant confirmation that may arrive at mobile device before, at the same time as, or subsequent to a confirmation received at the mobile device from the POS terminal 730.

Further, the present subject disclosure may be incorporated in a mobile wallet service, such as that described in U.S. patent application Ser. No. 11/727,493, filed Mar. 27, 2007, which is hereby incorporated by reference herein in its entirety into this disclosure. With mobile wallet services, technology may be embedded into mobile devices that allow the user to pay for goods and services in a retail environment. Briefly, a mobile wallet includes any application that helps facilitate transactions by storing a customer's credit card, debit card, bank account, and other financial information for use with electronic transactions. The mobile wallet includes payment instruments, debit/credit/gift card details, etc. When completing a transaction, the application is launched for card selection and security verification. A PIN may be required.

Figure 8:
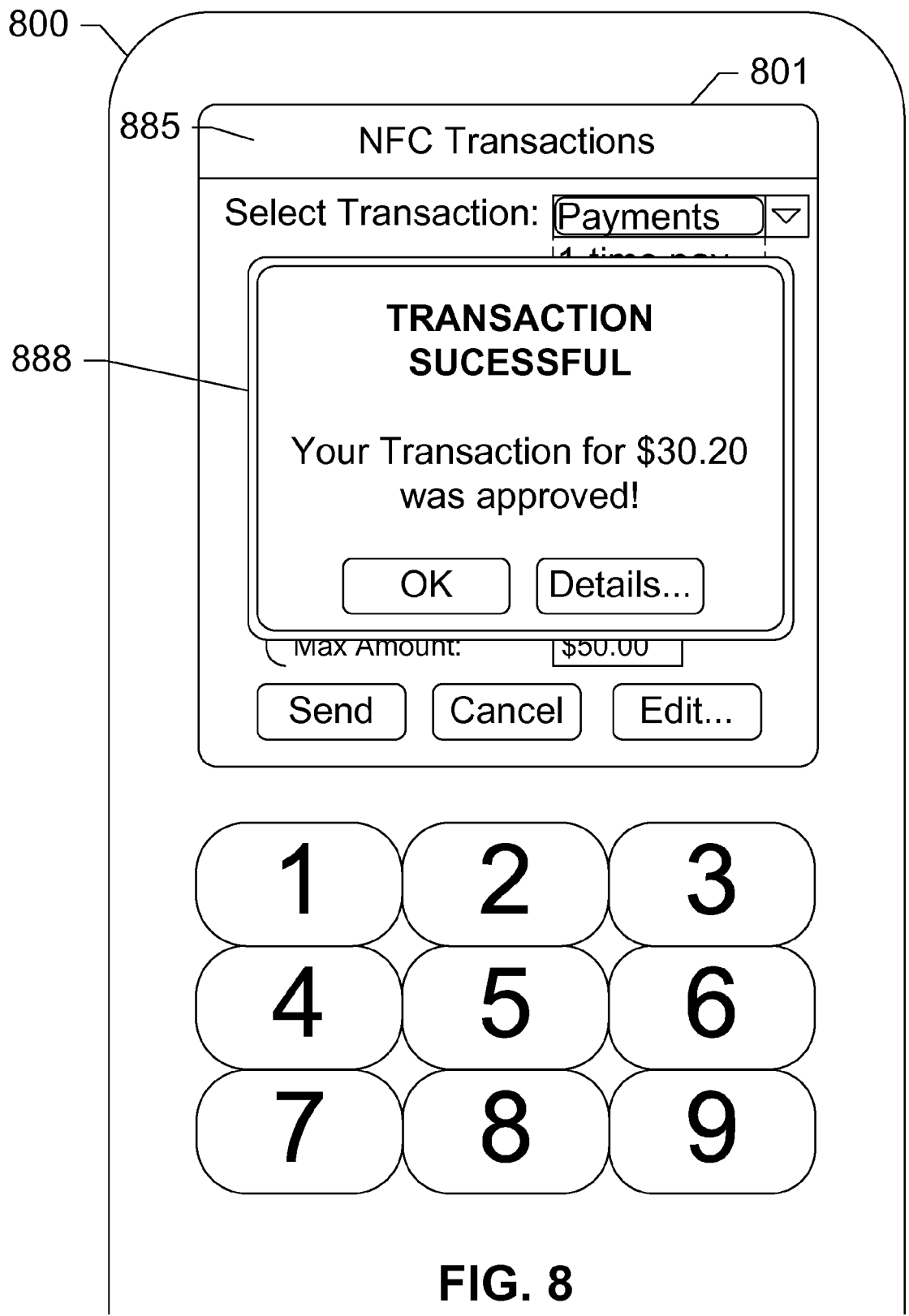
FIG. 8 shows a payment confirmation on a mobile device, according to an example embodiment of the subject disclosure.

FIG. 8 shows a payment confirmation on a mobile device 800 with visual display 801, according to an example embodiment of the subject disclosure. Payment confirmation 888 may be displayed as soon as the POS terminal completes the transaction as described above, and may be displayed in response to a confirmation message received from either or both of a POS terminal and a remote server. A mobile wallet application, such as NFC transactions application 885 launches the confirmation 888, with a brief summary of the transaction, and an option to view more details. Viewing more details would provide the user with additional information related to any restrictions on the transaction, itemized bills, or any other information communicated from the remote scanner to the POS terminal. Further, this confirmation 888 may assure the customer/user that any sensitive transaction information has been erased from a memory of a remote scanner, and possibly from the POS terminal. This reduces the chances of an inadvertent scan of the remote scanner in the future, as well as ensuring that no future unauthorized use occurs.

As described above, a remote scanner need not necessarily be transported back and forth from a POS terminal to a customer. In other words, a remote scanner may be positioned and fixed in an area that may be convenient to a customer, while remaining in wired or wireless communication with its associated POS terminal. FIG. 9 shows a remote scanner embedded within a dining table, according to example embodiments of the subject disclosure. Table 990 may be one of many tables in a restaurant. The figure shows a cutaway of a table 990 having a placement including a plate and silverware, as well as an embedded remote scanner 920. Remote scanner 920 may have an identifier unique to the table 990, thereby being able to identify itself to a POS terminal in communication with remote scanner 920. The communication may be wired or wireless, depending on a preference of an owner or operator of the restaurant. In some example embodiments, remote scanner 920 may automatically detect a presence of wireless communication device and alert a waiter accordingly. Remote scanner 920 may further launch logic or software enabling a customer to select menu items, provide transaction information, summon a waiter, etc. The wireless communication device of the customer may further automatically receive identification information of a POS associated with remote scanner 920, initiate communication with the remote scanner 920, etc. For groups of customers having one individual desiring to pay for the whole bill, example embodiments of the subject disclosure present an option to not only pay, but also handle ordering for one or more placements at the table. Customers may accept or deny this other customer's offer to pay and/or order. In these examples, besides communicating with the customer's mobile device, remote scanner 920 may further communicate with other dining partners' devices, via any wireless communication technology. Moreover, a payment or mobile wallet server on a cellular or wide-area network may handle multiple ordering and/or bill splitting, with any changes made by one device being reflected in their neighbor's devices. In further embodiments, restrictions may be provisioned remote scanner 920 such as disabling alcoholic purchases for those under the legal age limit, alerting staff if communication with a mobile device is lost, preventing unauthorized orders, etc. Moreover, the table 990 may be any table at a venue where purchases are allowed, such as a dining table, a table at a casino, a table on a train/bus/aircraft, a concert venue, etc., with the system being adapted to fit the purpose using the several features described in the subject disclosure.

Figure 10A:
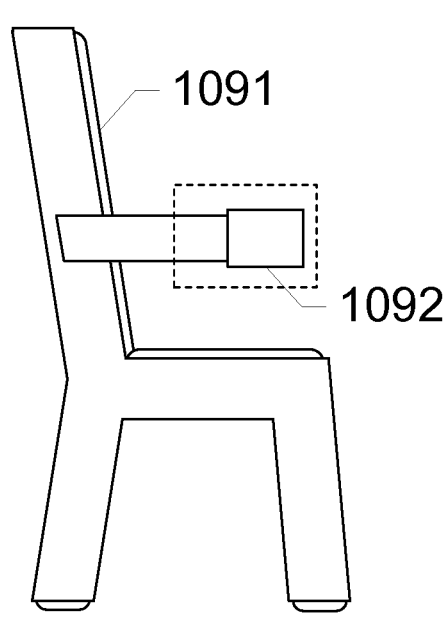
FIGS. 10A-10B show a remote scanner embedded within a chair, according to example embodiments of the subject disclosure.
Figure 10B:
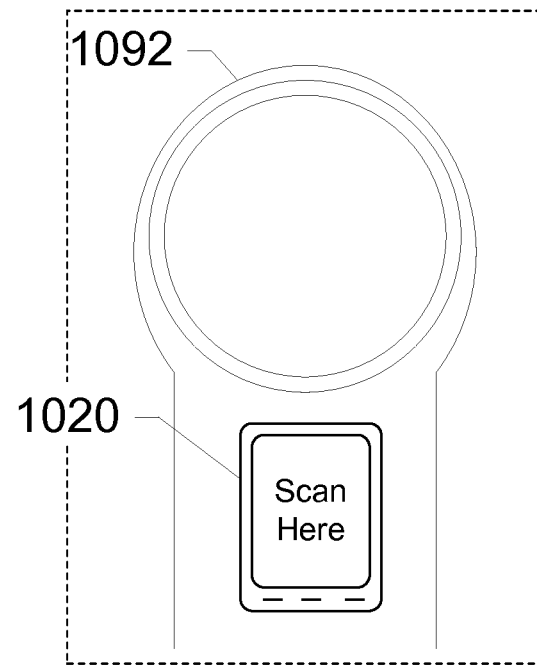

FIGS. 10A-10B show a chair 1091 having an arm rest 1092 incorporating an embedded remote scanner 1020, according to an example embodiment of the subject disclosure. FIG. 10A shows chair 1091 including an arm rest 1092. FIG. 10B shows an enlarged overhead view of the arm rest 1092. A remote scanner 1020 may be coupled just below a cup holder, where it is visible to and directly accessible by a user of chair 1091. As in the table embodiment described above, remote scanner 1020 may be in communication with a POS server associated with remote scanner 1020, and enables a user to conveniently provide authentication and conduct transactions using their mobile device. Chair 1091 with embedded remote scanner 1020 may be used in restaurants, theaters, multi-use venues, etc. that experience frequent changes in chair placement. Further, as per the requirements of the application, the remote scanner 1020 may communicate with the wireless device using differing technology and standards such as NFC, RFID, BLUETOOTH, ZIGBEE, Z-WAVE, etc.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A point-of-sale terminal comprising:
a processor; and
a memory storing instructions that, when executed by the processor, cause the processor to perform operations comprising
transmitting, to a remote scanner, a request for transaction information corresponding to a transaction associated with a user,
monitoring for a presence of the remote scanner,
monitoring the remote scanner to determine whether a restriction is triggered, and
based upon determining that the remote scanner does not trigger the restriction and in response to detecting the presence of the remote scanner, receiving, from the remote scanner, the transaction information, wherein the transaction information is received by the remote scanner from a mobile device associated with the user.

2. The point-of-sale terminal of claim 1, wherein monitoring the remote scanner to determine whether the restriction is triggered comprises monitoring the remote scanner to determine whether the remote scanner triggers a geographical restriction.

3. The point-of-sale terminal of claim 1, wherein the request for the transaction information includes a bill.

4. The point-of-sale terminal of claim 1, wherein the operations further comprise generating, in response to receiving an order associated with the transaction, the request for the transaction information corresponding to the transaction, wherein the order is received from the remote scanner.

5. The point-of-sale terminal of claim 1, wherein the transaction information comprises identification information of the mobile device and payment information.

6. The point-of-sale terminal of claim 5, wherein the operations further comprise executing a payment associated with the transaction using the payment information of the transaction information.

7. The point-of-sale terminal of claim 1, wherein the request for the transaction information comprises a format for the transaction information.

8. The point-of-sale terminal of claim 7, wherein the transaction information received by the remote scanner from the mobile device is formatted by the mobile device according to the format.

9. The point-of-sale terminal of claim 1, wherein the operations further comprise:
verifying the transaction information with a server;
in response to receiving verification of the transaction information from the server, processing the transaction; and
providing, to the mobile device, a confirmation of the transaction.

10. The point-of-sale terminal of claim 9, wherein the operations further comprise providing, to the remote scanner, the confirmation of the transaction, wherein the remote scanner erases residual transaction information of the transaction information in response to receiving the confirmation of the transaction.

11. A method comprising:
   transmitting, by a processor of a point-of-sale terminal to a remote scanner, a request for transaction information corresponding to a transaction associated with a user;
   monitoring, by the processor of the point-of-sale terminal, for a presence of the remote scanner;
   monitoring, by the processor of the point-of-sale terminal, the remote scanner to determine whether a restriction is triggered; and
   based upon determining that the remote scanner does not trigger the restriction and in response to detecting the presence of the remote scanner, receiving, by the processor of the point-of-sale terminal from the remote scanner, the transaction information, wherein the transaction information is received by the remote scanner from a mobile device associated with the user.

12. The method of claim 11, wherein monitoring the remote scanner to determine whether the restriction is triggered comprises monitoring the remote scanner to determine whether the remote scanner triggers a geographical restriction.

13. The method of claim 11, further comprising generating, in response to receiving an order associated with the transaction, the request for the transaction information corresponding to the transaction, wherein the order is received from the remote scanner.

14. The method of claim 11, wherein the transaction information comprises identification information of the mobile device and payment information.

15. The method of claim 14, further comprising executing a payment associated with the transaction using the payment information of the transaction information.

16. The method of claim 11, wherein the request for the transaction information comprises a format for the transaction information.

17. The method of claim 16, wherein the transaction information received by the remote scanner from the mobile device is formatted by the mobile device according to the format.

18. The method of claim 11, further comprising:
   verifying the transaction information with a server;
   in response to receiving verification of the transaction information from the server, processing the transaction; and
   providing, to the mobile device, a confirmation of the transaction.

19. A non-transitory computer-readable medium storing instructions that, when executed by a processor of a point-of-sale terminal, cause the processor to perform operations comprising:
   transmitting, to a remote scanner, a request for transaction information corresponding to a transaction associated with a user;
   monitoring for a presence of the remote scanner;
   monitoring the remote scanner to determine whether a restriction is triggered; and
   based upon determining that the remote scanner does not trigger the restriction and in response to detecting the presence of the remote scanner, receiving, from the remote scanner, the transaction information, wherein the transaction information is received by the remote scanner from a mobile device associated with the user.

20. The non-transitory computer-readable medium of claim 19, wherein monitoring the remote scanner to determine whether the restriction is triggered comprises monitoring the remote scanner to determine whether the remote scanner triggers a geographical restriction.

* * * * *